United States Patent [19]

Fluck

[11] Patent Number: 5,186,599
[45] Date of Patent: Feb. 16, 1993

[54] METHOD AND APPARATUS FOR FORMING GROUPS OF FLAT ITEMS

[75] Inventor: René Fluck, Schleitheim, Switzerland

[73] Assignee: Sig Schweizerische Industrie-Gesellschaft, Neuhausen am Rheinfall, Switzerland

[21] Appl. No.: 688,249

[22] Filed: Apr. 22, 1991

[30] Foreign Application Priority Data

Apr. 23, 1990 [CH] Switzerland ............... 1361/90

[51] Int. Cl.$^5$ ........................... B65B 5/08
[52] U.S. Cl. ........................ 414/792.9; 414/786; 53/532; 53/540
[58] Field of Search ............ 414/789.6, 793, 792.8, 414/792.7, 792.6, 792.5, 788.4, 788.7, 730, 736, 737, 752, 792.9; 53/540, 532, 251, 254, 538; 198/418.3

[56] References Cited

U.S. PATENT DOCUMENTS

| | | | |
|---|---|---|---|
| 3,368,324 | 2/1968 | Leedy | 414/752 |
| 3,555,770 | 1/1971 | Rowekamp | 53/251 X |
| 3,735,556 | 5/1973 | Dille et al. | 53/246 X |
| 3,834,115 | 9/1974 | Johnson et al. | 53/251 X |
| 3,920,128 | 11/1975 | Baker | 414/737 |
| 4,385,482 | 5/1983 | Booth | 53/251 X |

FOREIGN PATENT DOCUMENTS 521265  5/1972  Switzerland .

Primary Examiner—F. J. Bartuska
Assistant Examiner—Scott L. Lowe
Attorney, Agent, or Firm—Spencer, Frank & Schneider

[57] ABSTRACT

An apparatus for forming groups of flat, face-to-face stacked items includes a conveyor belt for receiving the items in a flat-lying orientation; a motor for driving the conveyor belt to advance the items disposed thereon in a conveying direction; a sensor disposed above the conveyor belt for determining a position of individual items on the conveyor belt; a plurality of group-forming chambers; a plurality of serially disposed gripping units situated downstream of the sensor as viewed in the conveying direction for grasping the items advanced on the conveyor belt and for introducing the items into the group-forming chambers; and a control device having an input connected to the sensor and outputs connected to the gripping units for controlling the gripping units as a function of signals applied to the control device by the sensor.

16 Claims, 6 Drawing Sheets

METHOD AND APPARATUS FOR FORMING GROUPS OF FLAT ITEMS

BACKGROUND OF THE INVENTION

This invention relates to a method of and an apparatus for forming groups of face-to-face stacked flat articles, particularly confectionery items, such as crackers or cookies. The apparatus includes a conveyor on which the items are advanced in a flat-lying state. The items are generally randomly arranged in rows and columns and thus form what will be hereafter referred to as an "item carpet". The apparatus further includes item group-forming chambers which arrange the items from the item carpet into groups of stacked items.

A method and an apparatus of the above-outlined type is known, for example, from Swiss Patent No. 521,265. In this prior art construction the items of the item carpet are first arranged into columns, and, subsequently, the items are accumulated by gripping fingers which advance the items above a stage. In case underneath the stage two items are in a superposed state, they are shifted by pushers into group-forming chambers where the items are stacked. While such an apparatus has proven generally to be satisfactory, it has the disadvantage that it requires separate column forming, guiding and item accumulating devices. Such arrangements limit the capacity of the apparatus and also, the items must be relatively robust. The known apparatus is inadequate for items such as delicate, fragile cookies and for certain particular item configurations.

SUMMARY OF THE INVENTION

It is an object of the invention to provide an improved method and apparatus of the above-outlined type which operates with a high output and yet ensures a gentle handling of the items.

This object and others to become apparent as the specification progresses, are accomplished by the invention, according to which, briefly stated, the apparatus for forming groups of flat, face-to-face stacked items includes a conveyor belt for receiving the items in a flat-lying orientation; a motor for driving the conveyor belt to advance the items disposed thereon in a conveying direction; a sensor disposed above the conveyor belt for determining a position of individual items on the conveyor belt; a plurality of group-forming chambers; a plurality of serially disposed gripping units situated downstream of the sensor as viewed in the conveying direction for grasping the items advanced on the conveyor belt and for introducing the items into the group-forming chambers; and a control device having an input connected to the sensor and outputs connected to the gripping units for controlling the gripping units as a function of signals applied to the control device by the sensor.

DESCRIPTION OF THE PREFERRED EMBODIMENTS

Figure 1:
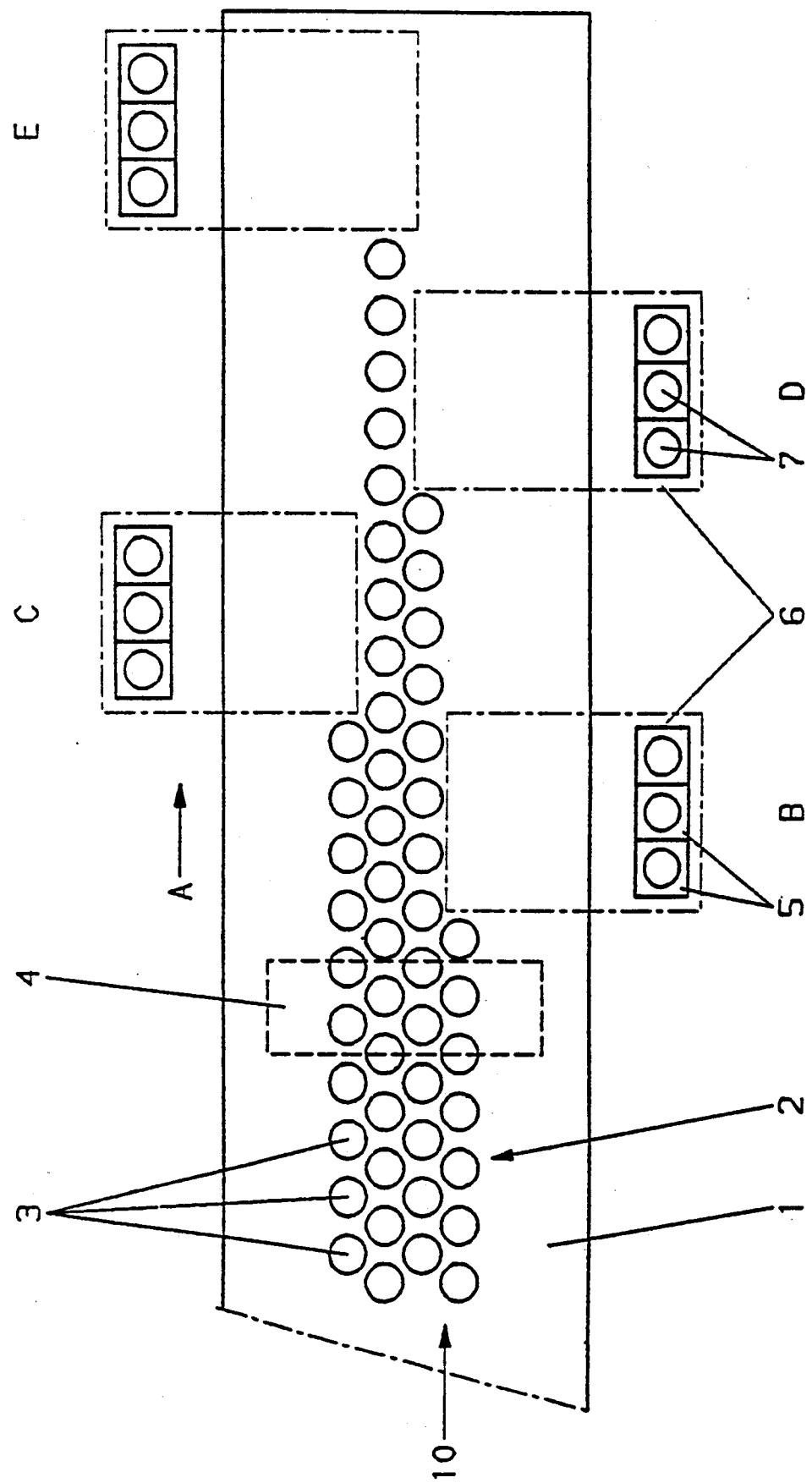
FIG. 1 is a schematic top plan view of an apparatus incorporating the invention.

FIG. 1 illustrates the operational principle of the invention.

On a conveyor belt 1 individual, flat-lying confectionery items 3 are advanced in a conveying direction A as an item carpet 2 in a slightly spaced, side-by-side and serially arranged orientation as they emerge from a non-illustrated baking oven. A sensor station 4 provided with a plurality of reflecting light barriers determines the position of the items on the conveyor belt 1. Downstream of the sensor station 4—as viewed in the conveying direction A—on either side of the conveyor belt 1 a plurality of consecutive stations B, C, D and E are arranged which are provided with gripping devices for successively removing items 3 from the belt 1 and for stacking the flat-lying items on one another in item group-forming chambers 5. The group-forming chambers 5 are schematically shown in FIG. 1 as packaging containers, each accommodating three stacks 7 of items 3. The item quantity decrease on the conveyor 1 in the conveying direction A thus equals the item quantity increase in the item group-forming chambers 5.

Figure 2:
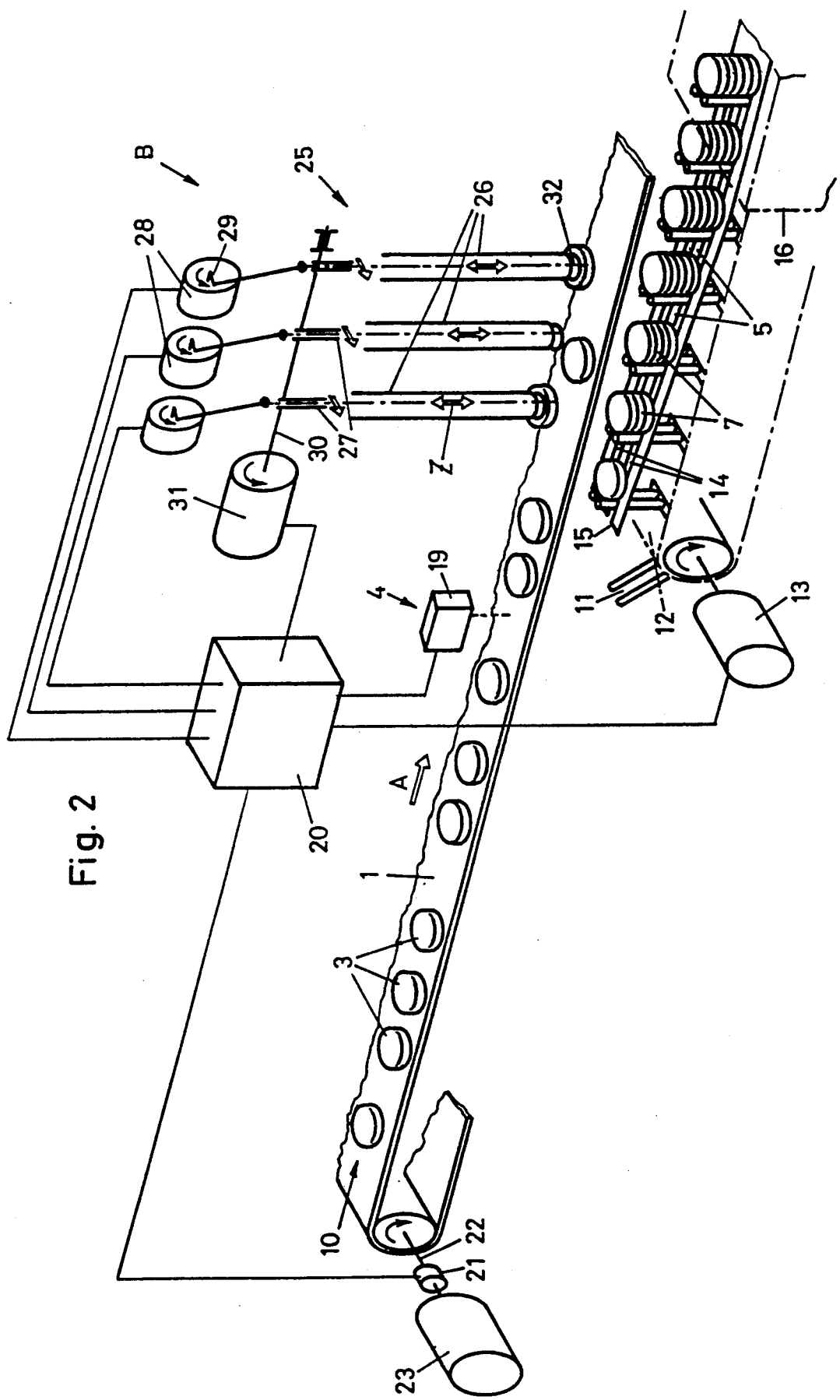
FIG. 2 is a schematic fragmentary perspective view of a preferred embodiment of the invention.

In the schematic FIG. 2, only the outermost right-hand longitudinal marginal zone of the conveyor belt 1 is shown (as viewed in the conveying direction A) and, accordingly, only the outermost, right-hand column 10 of the item carpet 2 of FIG. 1 is illustrated and also, only the group-forming station B is shown. The item group-forming chambers 5 are formed by intermediate spaces defined between fork-shaped pushers 11 which are secured at uniform distances to an endless belt 12 driven by a motor 13. The tines of the pushers 11 project through slots 14 provided in a sloping ramp 15. The pushers 11 shift the formed stacks 7, for example, to a packing machine 16. Such a conveyance to the machine 16 may be effected directly as illustrated or with the intermediary of an item accumulating (storing) line.

In FIG. 2, of the sensor station 4 illustrated in FIG. 1 only the outermost optical barrier 19 is shown which scans the items 3 of the outermost column 10 and reports their position on the conveyor belt 1 to a control device 20. For purposes of correlation, the control device 20 further receives a signal of an angular position transmitter 21 which is coupled to the rotary shaft 22 of the motor 23 driving the conveyor belt 1. The gripping unit 25 in the station B includes three grippers 26 arranged in series in the conveying direction A. The grippers 26 are each guided in a longitudinal guide 27 and are displaceable in the height direction Z by a crank 29 each driven by a separate motor 28. The three guides 27 are mounted on a common shaft 30 which is oriented parallel to the conveyor belt 1 and the conveying direction A and is driven by a motor 31. Each gripper 26 is provided at its lower end with a suction head 32 which is coupled to a non-illustrated suction line. The motors 13, 28 and 31 are connected with the control device 20.

In the description which follows, the operation of the above-described device will be set forth.

The randomly distributed items 3 on the conveyor belt 1 are scanned by the optical barriers 19 and the position of the items on the belt 1 is stored in the control device 20 in conjunction with signals transmitted by the angular position sensor 21 and representing the angular orientation of the conveyor belt drive shaft 22. As the leading item 3 reaches the downstream-arranged first gripper 26 the control device 20 energizes the motor 28 of that gripper, causing the latter to be lowered and to engage and lift the item 3 from the belt 1 with the suction head 32. The two immediately successive items 3 are grasped and lifted in a similar manner by the other two grippers 26. As soon as all three grippers 26 have each grasped an item, the motor 31 rotates the shaft 30 and thus the three grippers 26 are moved jointly into a position of the item group-forming chambers 5 and the vacuum supply to the grippers 26 is interrupted for a short period so that the items are deposited in the chambers 5 to form stacks 7 therein. Thereafter, the grippers 26 are moved into their earlier position by the motor 31 in order to grasp and lift the successive items 3 of the item column 10. After each such step or after every other such step, the belt 12 is moved by the motor 13 through a distance corresponding to the length of one chamber. In the variant schematically shown in FIG. 1 where packaging containers 6 are being filled, these containers 6 may, in the alternative, remain stationary in the same position until they are filled and may thereafter be replaced by respective empty containers 6.

The above-described apparatus may operate at a very high speed because the items 3 need not be accumulated and they are grasped during their advance in the conveying direction A. In this apparatus no alignment of the items with respect to one another is necessary so that the items may be directly grasped by the apparatus as they are delivered, for example, from a baking oven or another upstream-arranged item handling machine. Since no item accumulating conveyor lengths are necessary, the items are handled in a very gentle manner so that the apparatus may be well used even for very delicate, fragile items. By virtue of the fact that no aligning and item accumulation devices are needed and because a plurality of grippers 26 may be shifted jointly, the structural length of the apparatus is short as compared to conventional stacking devices.

Further, a very high degree of operational safety may be ensured by arranging, downstream of the normally operating gripping units 25, a standby gripping unit which may serve more than one column 10. In case of breakdown of one of the gripping units 25, the standby gripping unit may assume its function. Further individual items which escaped the regular gripping units 25 may be caught by the standby gripping unit by providing each gripper 26 with a vacuum sensor which reports the proper grasping of an item 3 to the control device 20.

The described apparatus is of modular construction and may thus be manufactured economically. It is, for example, also feasible to perform with an additional, down-stream arranged gripping unit 25 a stack complementation preceded by a weight or length check of the stack 7. Such a downstream-arranged gripping unit may be, as commanded by the control device 20, supplied with the required number of items 3 by one of the upstream-arranged gripping units 25 in case such gripping unit exceeds the required number of items.

Figure 3:
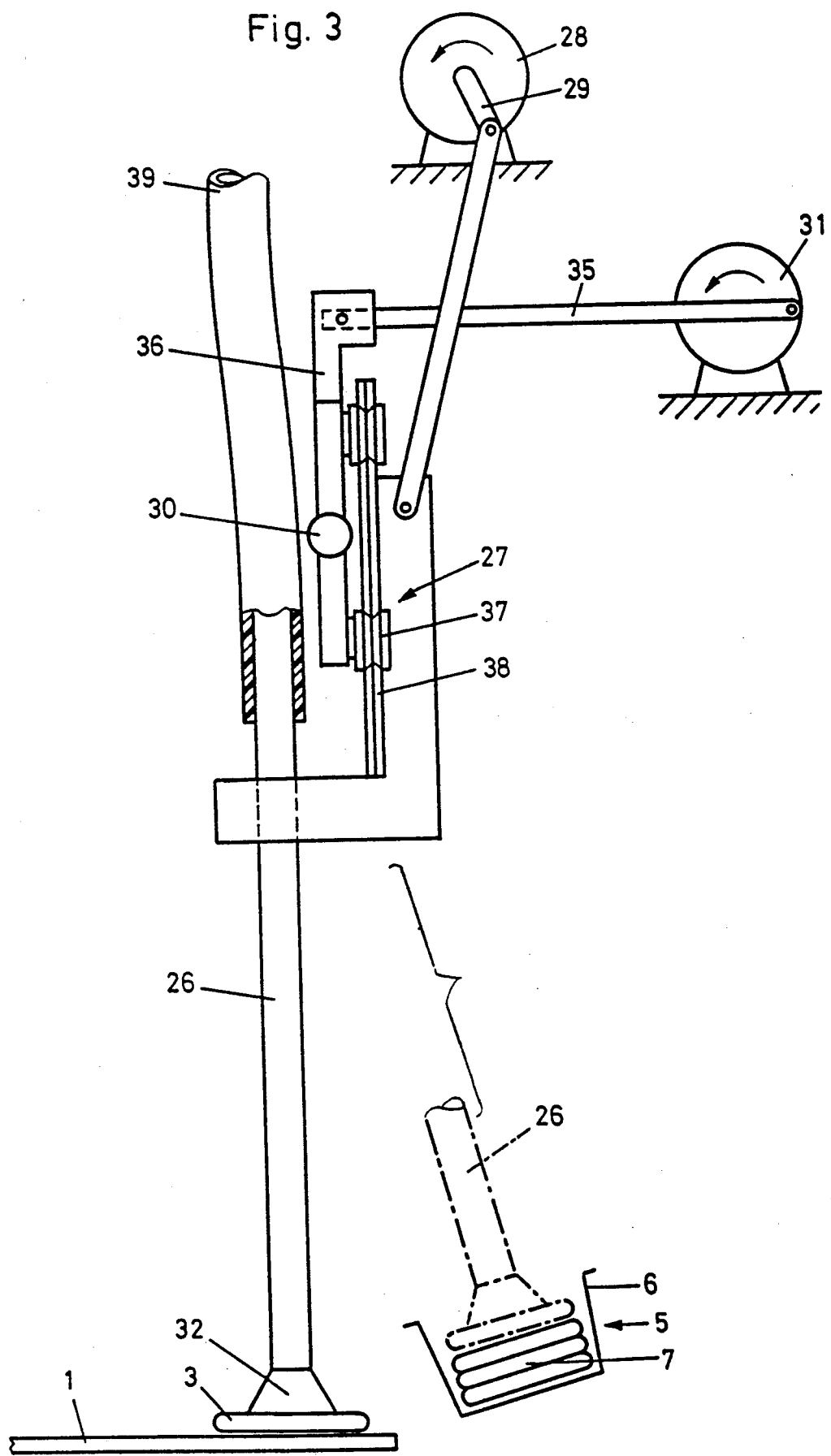
FIG. 3 is a schematic front elevational view, partially in section, of a part of the preferred embodiment.
Figure 4:
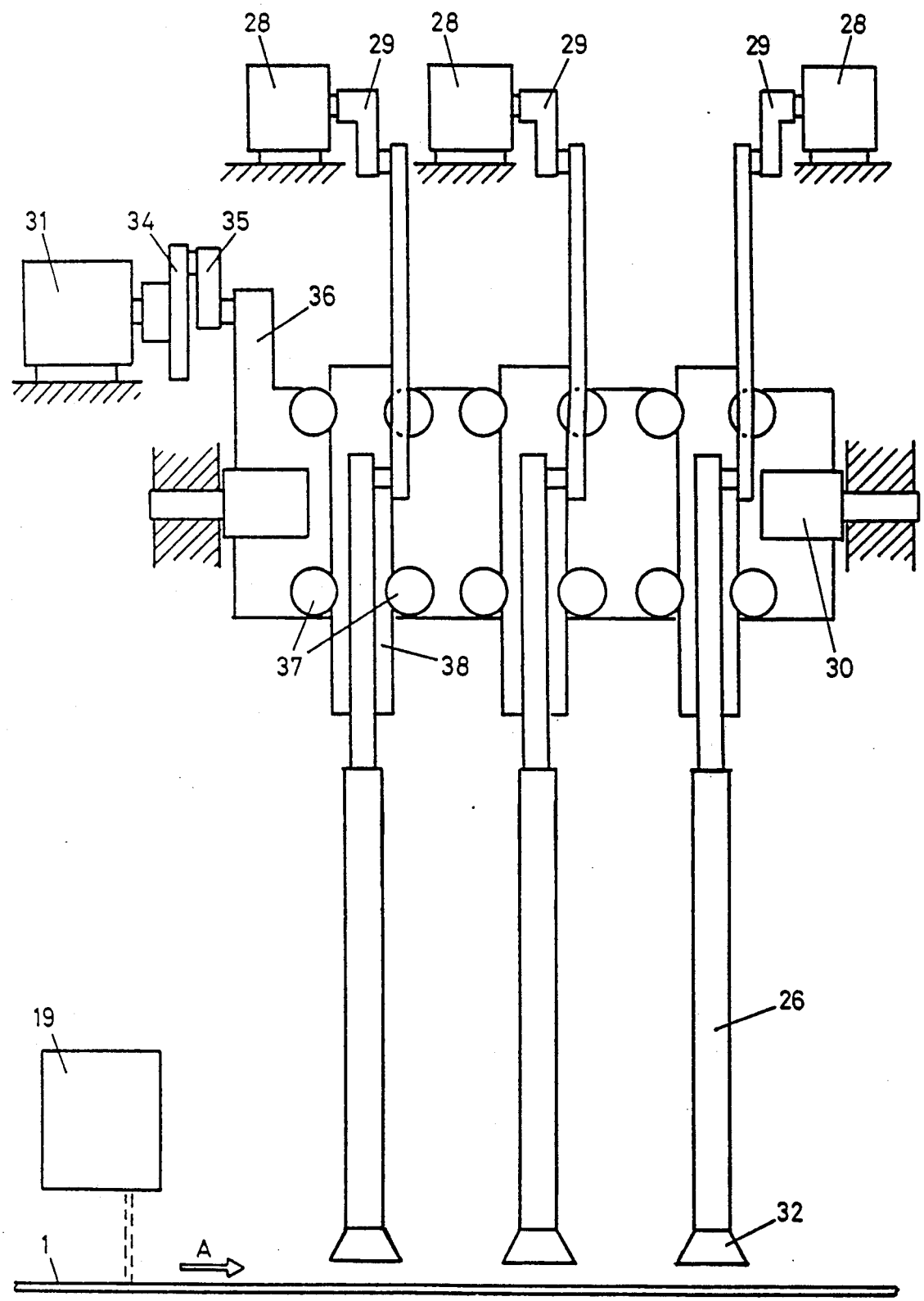
FIG. 4 is a schematic side elevational view of the structure shown in FIG. 3.

Turning to FIGS. 3 and 4, the gripping unit 25 schematically shown in FIG. 2 is illustrated in more detail. The gripper 26 is suspended from a guide 27 which, in turn, is pivotally supported by a horizontal shaft 30. The motor 31, during a 180°-turn, rotates the shaft 30 by means of a crank 34, a push rod 35 and a lever 36 to move the gripper 26 into the dash-dotted position shown in FIG. 3. The guide 27 is formed of two pairs of circumferentially grooved rollers 37 engaging respective rails 38 of wedge-shaped cross section. The item group-forming chambers 5 are packaging containers 6 similarly to FIG. 1. The tubular gripper 26 is connected by a hose 39 to a vacuum source, not shown.

Figure 5:
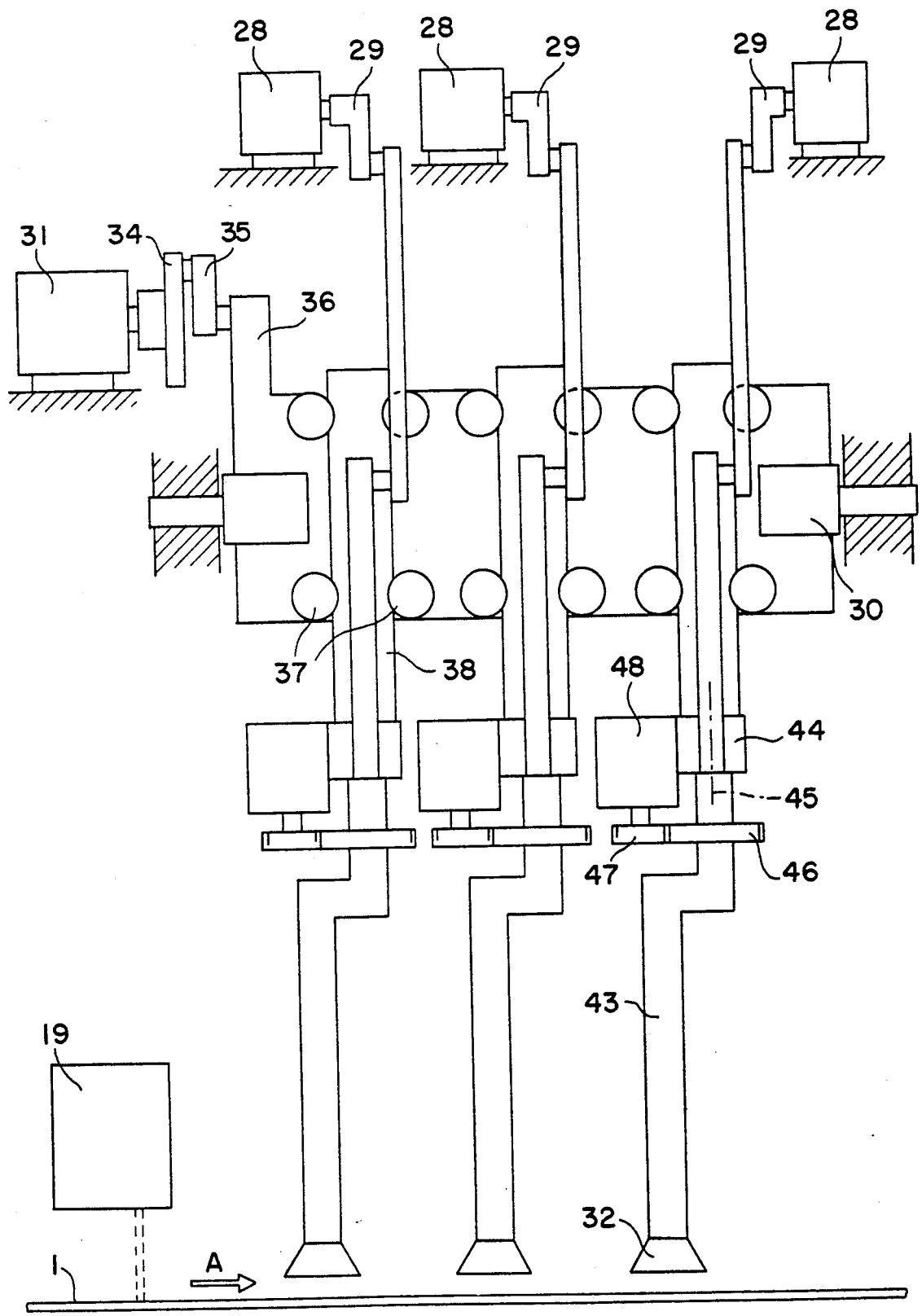
FIG. 5 is a schematic side elevational view of another preferred embodiment of the invention.

The embodiment shown FIG. 5 differs from that of FIG. 4 in that the suction heads 32 of the grippers 26 are shiftable individually transversely to the conveying direction A. For this purpose the tubes 43 of the grippers 26 are angled twice underneath a rotary bearing 44 so that the suction heads 32 are disposed eccentrically to the rotary axis 45. To each gripper tube 43, underneath the bearing 44, a gear 46 is secured which meshes with a pinion 47 which, in turn, is driven by a further motor 48. By virtue of this arrangement, each suction head 32, driven by the respective motor 48, may be shifted transversely to the conveying direction A. This is particularly useful if the item carpet 2 does not form item columns 10. In such a case, for controlling the motors 48, the sensor station 4 has to transmit signals representing the position of the items transversely to the conveying direction A. This is feasible, for example, by using a significantly greater number of optical barriers 19 or a TV camera associated with an appropriate evaluating device.

Figure 6:
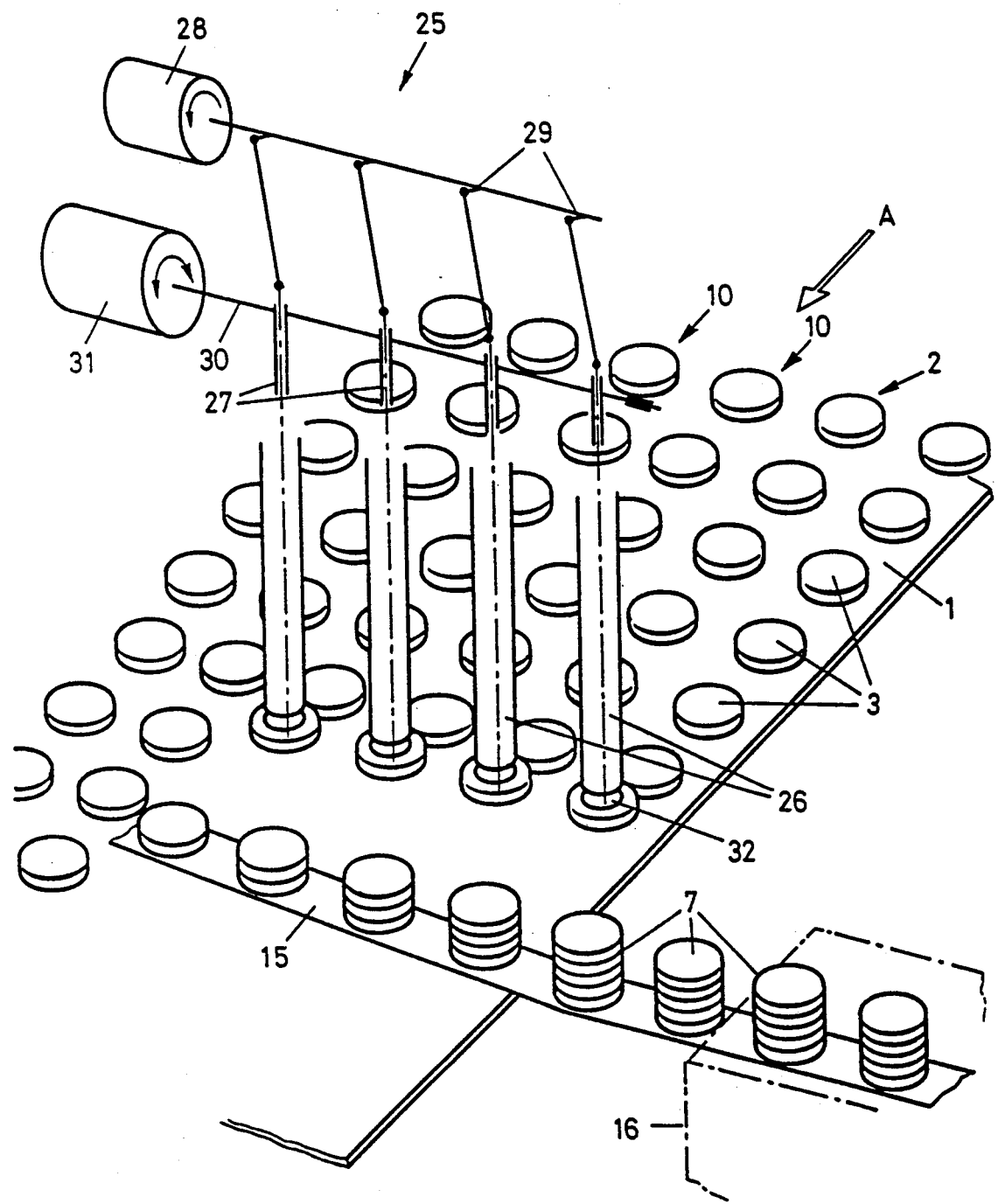
FIG. 6 is a schematic perspective view of still another preferred embodiment of the invention.

In the embodiment according to FIG. 6, the ramps 15 (only one shown) and the shaft 30 are oriented transversely to the conveying direction A. Each ramp 15 extends above the conveyor belt 1. The item carpet 2 is formed of aligned rows and columns 10 so that all the grippers 26 of the gripping unit 25 have a common motor 28 for executing the lifting and lowering motions thereof. In case of irregular distances between the items 3 within the columns 10 each gripper 26 would need its own lifting motor similarly to the embodiment shown in FIGS. 2, 3, 4 and 5.

It will be understood that the above description of the present invention is susceptible to various modifications, changes and adaptations, and the same are intended to be comprehended within the meaning and range of equivalents of the appended claims.

What is claimed is:

1. A method of forming groups of flat, face-to-face stacked items, comprising the following steps:
    (a) advancing an item carpet in a conveying direction, wherein the items of the item carpet are in a flat-lying, generally side-by-side arranged state;
    (b) determining positions of the items in the item carpet by a sensor and storing data representing said positions;
    (c) individually grasping the items of the item carpet at locations downstream of the sensor as viewed in the conveying direction; and
    (d) moving the individually grasped items into group-forming chambers such that, as viewed in the conveying direction, the quantity of items in the item carpet decreases and the quantity of items in the group-forming chambers increases.

2. A method as defined in claim 1, wherein the grasping step is performed while the items advance in the conveying direction.

3. A method as defined in claim 1, wherein the amount of decrease of the quantity of items in the item carpet exactly equals the amount of increase of the quantity of items in the group-forming chambers.

4. A method as defined in claim 1, wherein a number of items grasped at different times in the performance of step (c) are simultaneously moved into the group-forming chambers in the performance of step (d).

5. A method as defined in claim 1, further comprising the step of lifting the items after step (c) and before step (d).

6. The method as defined in claim 1, wherein step (a) comprises the step of moving, by a motor-driven shaft, a conveyor belt having an upper surface supporting the item carpet; further comprising the step of determining an angular position of the shaft.

7. An apparatus for forming groups of flat, face-to-face stacked items, comprising
(a) means for advancing an item carpet in a conveying direction, wherein the items of the item carpet are in a flat-lying, generally side-by-side arranged state;
(b) means for determining positions of the items in the item carpet and means for storing data representing said positions; said means for determining positions including a sensor;
(c) means for individually grasping the items of the item carpet at locations downstream of the sensor as viewed in the conveying direction; and
(d) means moving the individually grasped items into group-forming chambers such that, as viewed in the conveying direction, the quantity of items in the item carpet decreases and the quantity of items in the group-forming chambers increases.

8. The apparatus as defined in claim 7, wherein said means for advancing the item carpet comprises a conveyor belt and a motor having a drive shaft driving said conveyor belt; further comprising angular position sensing means for sensing angular positions of said drive shaft.

9. An apparatus for forming groups of flat, face-to-face stacked items, comprising
(a) a conveyor belt for receiving the items in a flat-lying orientation;
(b) motor means including a drive shaft for driving said conveyor belt to advance the items disposed thereon in a conveying direction;
(c) sensor means disposed above the conveyor belt for determining a position of individual items on the conveyor belt;
(d) means defining a plurality of group-forming chambers for forming article groups therein;
(e) a plurality of serially disposed gripping units situated downstream of the sensor means as viewed in the conveying direction for grasping the items advanced on the conveyor belt and for introducing the items into the group-forming chambers;
(f) a control device having an input connected to said sensor means and outputs connected to said gripping units for controlling the gripping units as a function of signals applied to the control device by said sensor means; and
(g) a position determining means for sensing angular positions of said drive shaft; said position determining means being connected to an input of said control device.

10. An apparatus as defined in claim 9, wherein each sad gripping unit comprises a plurality of grippers; each gripper being arranged for gripping a single item; and displacing means for jointly moving the grippers of the gripping unit into a position above said group-forming chambers.

11. An apparatus as defined in claim 10, wherein said sensor means includes means for determining a position of each item in the conveying direction and transversely thereto; further wherein at least one of said gripping units includes moving means for shifting each gripper relative to other said grippers of said at least one gripping unit transversely to said conveying direction.

12. An apparatus as defined in claim 10, further wherein each gripping unit includes moving means having a shaft supported in an orientation parallel to an upper surface of said conveyor belt, each gripper of a same gripping unit being supported by said shaft of said same gripping unit and drive means for rotating said shaft for effecting a simultaneous swinging motion of each said gripper of said same gripping unit.

13. An apparatus as defined in claim 12, wherein said drive means is connected to an output of said control device.

14. An apparatus as defined in claim 12, wherein said drive means is a first drive means; further comprising a separate guide member attaching each gripper to said shaft; and separate second drive means connected to each guide for moving each guide, together with the gripper attached thereto, relatively and transversely to said shaft in a generally vertical direction.

15. An apparatus as defined in claim 14, wherein said first and second drive means are connected to outputs of said control device.

16. An apparatus as defined in claim 14, wherein motions of the conveyor belt, rotary motions of said shaft, vertical motions of the grippers and displacements of said group-forming chambers are coordinated by said control device.

* * * * *